United States Patent [19]

Julian et al.

[11] Patent Number: 4,552,792

[45] Date of Patent: Nov. 12, 1985

[54] DECORATIVE LAMINATED WALL PANEL AND PROCESS FOR MAKING SAME

[75] Inventors: Jere C. Julian; Ozzie Fogle, both of Orangeburg; Roseann S. Helms, West Columbia, all of S.C.

[73] Assignee: Champion International Corporation, Stamford, Conn.

[21] Appl. No.: 666,903

[22] Filed: Oct. 31, 1984

[51] Int. Cl.$^4$ .................... B32B 21/06; B32B 23/08
[52] U.S. Cl. .................................. 428/40; 156/228; 156/306.6; 428/535; 428/537.1; 428/537.5
[58] Field of Search ............ 428/187, 530, 531, 535, 428/537.1, 537.5; 156/60, 228, 272, 306.6

[56] References Cited

U.S. PATENT DOCUMENTS

| | | | |
|---|---|---|---|
| 2,801,198 | 7/1957 | Morris et al. | 428/203 |
| 3,975,572 | 8/1976 | Power | 428/530 |
| 4,053,339 | 10/1977 | Story et al. | 428/326 |
| 4,109,043 | 8/1978 | DeLapp | 428/530 |
| 4,473,613 | 9/1984 | Jaisle et al. | 428/530 |

Primary Examiner—Paul J. Thibodeau
Attorney, Agent, or Firm—Evelyn M. Sommer

[57] ABSTRACT

A decorative panel is provided including a center ply formed from a wood veneer, a back ply formed from a kraft liner board or paperboard, and a free ply. The face ply includes a kraft linear backing sheet to which a topcoated thin decorative paper is laminated. The face ply is secured to the center ply by appropriate application of adhesive, heat and pressure.

13 Claims, 4 Drawing Figures

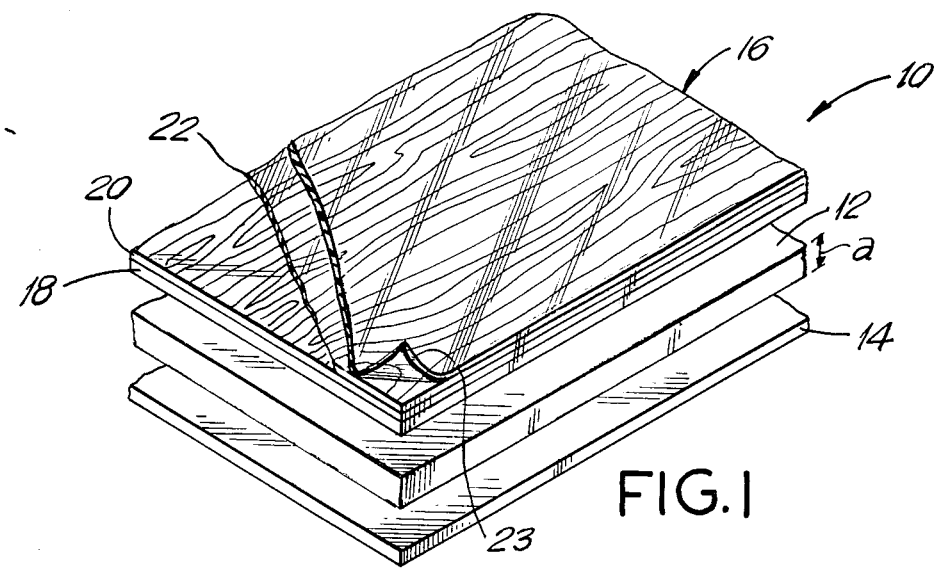
FIG.1
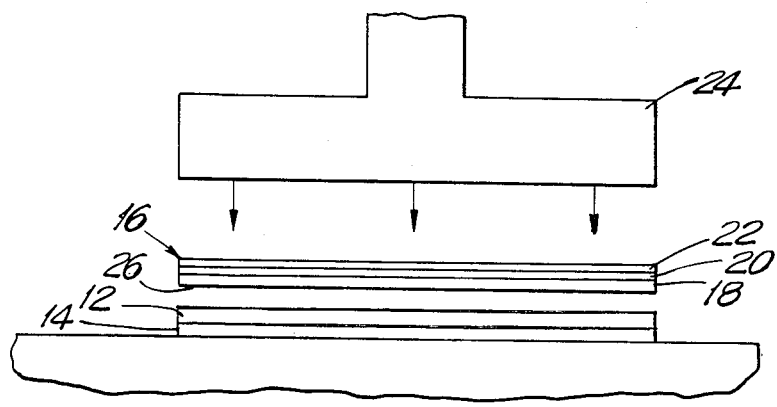
FIG.2
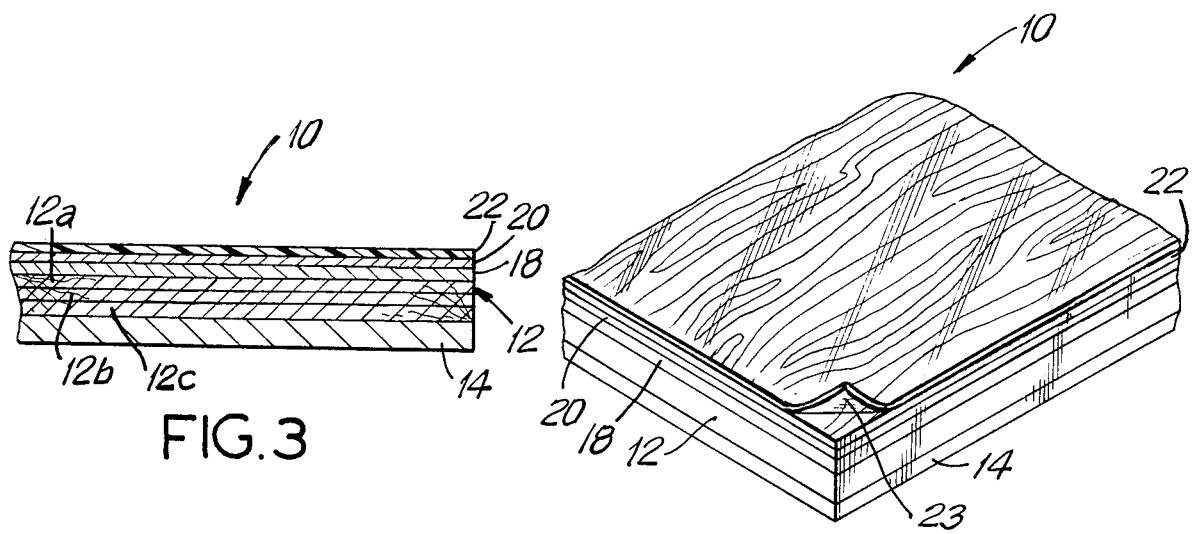
FIG.3
FIG.4

DECORATIVE LAMINATED WALL PANEL AND PROCESS FOR MAKING SAME

BACKGROUND OF THE INVENTION

Decorative panels often are applied to interior walls or ceilings of buildings or to the exterior of furniture pieces to enhance the aesthetic appearance of the surface to which they are applied. Decorative panels generally are not required to contribute to the structural support of the wall, ceiling, or other member to which they are applied. Rather, the decorative panel only is required to provide an attractive and durable finish to the structure.

Many decorative panels are made entirely from wood. Others include a wood substrate to which a decorative paper or coating is applied. Although the known decorative panels made entirely or substantially from wood are attractive and perform well, it often is desirable to provide a panel that is equally decorative, but substantially less costly.

Attempts have been made to laminate thin decorative papers to a wood substrate. Although decorative panels of this type often are aesthetically attractive, it has been found difficult to handle the thin decorative papers at the press lay-up area. More particularly, the thin decorative papers often are damaged prior to or during the lamination onto the wood substrate. As a result, the manufacture of decorative panels with thin papers applied directly to a wood substrate has required extensive time and extensive quality control checking.

One type of decorative panel formed from a composite of paper and hardboard, is shown in U.S. Pat. No. 4,053,339 which issued to Story et al. on Oct. 11, 1977 and is assigned to the assignee of the subject invention. U.S. Pat. No. 4,053,339 is directed to a method of making a panel wherein a paper is cemented to a hardboard drawn from pressed defibrated and refined wood chips. More particularly, U.S. Pat. No. 4,053,339 shows a mixture of defibrated wood chips and binder that is formed into a mat and coated with a glycol resin solution. A dry sheet of paper then is placed on the coated mat and the composite assembly is cured by the application of heat and pressure applied through platens.

U.S. Pat. No. 2,918,398 which issued to Dorland et al. on Dec. 22, 1958 also shows a particle board with a decorative paper overlay laminated thereto under heat and pressure.

Another decorative laminated structure is shown in U.S. Pat. No. 2,801,198 which issued to Morris et al. on July 30, 1957. More particularly, U.S. Pat. No. 2,801,198 shows a core formed from several sheets of kraft paper impregnated with a blend of phenolic resin having a decorative sheet impregnated with melamine-formaldehyde resin and a translucent overlay sheet also impregnated with melamine-formaldehyde resin. A bottom overlay sheet impregnated with a melamine-formaldehyde resin may be applied to the opposed side of the core.

U.S. Pat. No. 2,343,740 shows a panel formed from a plywood substrate having a loosely matted fibrous web impregnated with a thermosetting or thermoplastic binder applied thereto under heat and pressure. The loosely matted fibrous web may be a paper sheet which effectively masks any imperfections in the wood substrate.

U.S. Pat. No. 3,582,426 which issued to Meissner on June 1, 1971 shows an adhesive film imprinted with a particular design and applied to a wood substrate. A protective clear plastic sheet then is adhered to the substrate by means of the printed adhesive film.

Finally, U.S. Pat. No. 3,654,044 which issued on Apr. 4, 1972 to Hirota shows a decorative overlay paper having a dry weight in the range of 23 to 27 grams per square meter bonded to the surface of a plywood by a resin adhesive.

Although many of the above described structures perform well and are attractive, it is desired to develop a decorative panel that can be manufactured easily and inexpensively yet is desirably durable and attractive.

Accordingly it is an object of the subject invention to develop a decorative panel for use on walls, ceilings, articles of furniture and the like, and that is aesthetically attractive and durable.

It is another object of the subject invention to provide a decorative panel that can be manufactured easily and inexpensively and without damage occurring during the manufacturing.

It is an additional object of the subject invention to provide a decorative panel that avoids the lamination of thin decorative papers to a wood substrate.

It is a further object of the subject invention to provide a decorative panel that utilizes a smaller volume of wood then the typically used panel.

It is still another object of the subject invention to provide a decorative panel that utilizes at least one layer of kraft paper.

SUMMARY OF THE INVENTION

The subject invention is directed to a three-ply decorative panel including face, center and back plies. The center ply preferably is formed from a wood veneer, and provides the principal structural support for the panel. It is unnecessary for either of the opposed surfaces of the center wood veneer ply to be smoothly finished. The back ply is formed from either a kraft liner board or a paperboard. The center and back plies are adhered to one another such that the kraft liner board or paperboard provides a substantially smooth back surface for the decorative panel.

The face ply of the subject decorative panel preferably is formed from a thin topcoated decorative paper laminated to a kraft liner. The topcoating is a clear plastic, and preferably an alkyd melamine which protects the thin decorative paper. The laminated face layer including the topcoated thin decorative paper and kraft liner can be readily manipulated by available mechanical equipment with little or no chance of damage to the thin decorative paper, which by itself had presented problems. To further prevent damage during manufacture, shipping and storage, the decorative paper can be prelaminated with a removable protective sheet of plastic, which preferably is formed from Mylar. This Mylar sheet provides temporary protection, and is removed when the panel is put to use. In a alternate embodiment, the kraft liner is printed directly with a preferred decoration and/or color and is then topcoated with a plastic overlay.

The face, center and back plies of the subject decorative panel are laminated together under appropriate conditions of heat and pressure with flat platen pressing equipment. This can be accomplished by applying an appropriate adhesive to the center ply at the press lay-up area, or by pre-applying a dry film on at least one of the opposed surfaces prior to the platen pressing. For example, a dry film may be applied to the surface of the kraft liner opposite the decorative paper overlay during the initial lamination of the face ply.

The resulting panel provides the desired aesthetic appearance and a sufficient protective coating. Additionally, the center ply of wood veneer provides the necessary structural support for the decorative panel. However, the subject decorative panel can be manufactured at a lower cost than prior art panels because of the decreased volume of wood in the panel. Furthermore, the subject decorative panel can be manufactured more quickly and easily because of the improved ability to handle the decorative papers at the press lay-up area when the decorative papers have been previously laminated to a kraft liner.

BRIEF DESCRIPTION OF THE DRAWINGS

FIG. 1 is an exploded perspective view of the decorative panel of the subject invention.

FIG. 2 is a schematic illustration of one step in the manufacturing of the subject decorative panel.

FIG. 3 is a cross-sectional view of the panel of the subject invention.

FIG. 4 is a perspective view of the panel of the subject invention.

DETAILED DESCRIPTION OF THE PREFERRED EMBODIMENT

The decorative panel of the subject invention is indicated generally by the numeral 10 in FIG. 1. The decorative panel 10 includes a center ply 12, a back ply 14 and a face ply 16. The center ply 12 preferably is formed from a wood veneer having a thickness "a" sufficient to provide the desired structural support for the panel 10. Typically, the center ply 12 will have a thickness "a" of at least 0.10 inch. In certain instances, it may be desired to have the center ply 12 formed from a plurality of layers of wood veneer as employed in standard plywood and as indicated in FIG. 3 by numerals 12a, 12b and 12c. The use of several plies, in this manner, can provide additional strength to the composite decorative panel 10 if necessary.

The back ply 14 comprises a kraft liner board. Alternatively, the back ply 14 can be formed from another type of paperboard material. Back ply 14 functions to provide a smooth back surface for the panel 10. Consequently, splintering and splitting of the back surface of the panel is substantially eliminated. The thickness of the back ply 14 may vary considerably in accordance with such factors as the intended end use of the panel 10, the thickness of center ply 12, the relative smoothness of the surface of center ply 12 facing the back ply 14.

The face ply 16 comprises a plurality of layers of material laminated to one another prior to the pressing of the top ply 16 to the center ply 12. More particularly, the face ply 16 includes a backing layer 18 formed from a kraft liner material. A thin decorative paper layer 20 is laminated to the kraft liner layer 18. Thus, the laminated combination of kraft liner layer 18 and thin decorative paper layer 20 provides a flexible, attractive, yet sturdy face ply that can readily be handled with substantially less risk of damage to the thin decorative paper layer 20 than if the decorative paper layer 20 was used without the kraft liner 18. More particularly, the decorative paper layer 20 is not likely to become damaged when applied to the wood veneer center ply 12. To further protect the thin decorative paper layer 20, a protective topcoat 22 is applied to the surface of the thin decorative paper 20 that will lie opposite the kraft liner 18. The application of the topcoat 22 preferably is done prior to lamination of the decorative paper layer 20 to the kraft liner 18. The topcoat preferably is an alkyd melamine, and can be either clear or tinted.

The panel 10 may further be provided with a removable protective top layer 23, which preferably is formed from Mylar. The layer 23 provides additional protection during manufacture, shipping and storage, but is not required to be a permanent part of panel 10. Rather, the temporary protective layer 23 is peeled off prior to the final use of panel 10.

Depending upon the intended end use of decorative panel 10, it may be possible to replace the thin decorative paper layer 12 with a pattern printed directly onto the kraft liner 18 and then subsequently providing a protective topcoat 22. The range of aesthetic effects and patterns available with this latter alternative is somewhat more limited than with the use of the thin decorative paper layer 20. However, the completed panel 10 is less expensive and is more than adequate in strength and appearance for most uses.

The various layers of face ply 16 are laminated together, as described above, prior to lamination of the face ply 16 to the center ply 12. As noted above, this composite face ply 16 can readily be delivered to a platen press lay up area and adhered to a wood veneer center ply 12 with little risk of damage to the decorative paper layer 20. The lamination of the face ply 16 to the center ply 12 is illustrated schematically in FIG. 2. More particularly, the face ply 16 is laminated to the center ply 12 under the action of a flat platen press apparatus 24. This may be accomplished by first applying an adhesive directly to the center ply 12 at the press 24 prior to the movement of the face ply 16 into contact with the center ply 12. Alternatively, an appropriate heat and/or pressure activatable adhesive may be pre-applied to the face ply 16 as a dry film. This dry film may be applied directly to surface 26 of face ply 16 as part of the laminating process of face ply 16. Under either of these options, the face ply 16 is secured to the center ply 12 by the appropriate application of heat and pressure from platen 24. The back ply 14 can be adhered and pressed into face to face contact with the center ply 12 simultaneous to the securing of the face ply 16 to the center ply 12. Alternatively, the back ply 14 can be adhered to the center ply 12 either prior to or after adhering face ply 16 thereto.

Turning to FIGS. 3 and 4, the resulting decorative panel 10 includes a center ply 12 formed from a wood veneer, a back ply 14 formed from a kraft liner board or paperboard and a face ply 16. The center ply 12 can be a single sheet of veneer or a plurality of laminated veneer sheets 12a, 12b and 12c as shown in FIG. 3. The face ply 16 is formed from a kraft liner 18 to which a thin decorative paper 20 is laminated. A topcoat 22 of protective material such as an alkyd melamine is pre-applied over the decorative paper 20. The decorative paper layer 20 may be designed to resemble a wood grain pattern, a solid color, or any of an infinite variety of designs. A temporary and removable protective layer 23 of Mylar can be applied to panel 10 to provide additional protection during manufacture, shipping and storage.

The preferred method for producing the panel of the subject invention includes the first step of providing the center ply of wood. Although the center ply may be formed from a plurality of laminated layers, it is preferred that a single sheet of wood veneer having a thickness of approximately 0.1 inches be employed. The opposed surfaces of the center ply need not be sanded smooth, but should be substantially free of major surface irregularities.

The next step of the preferred method is to provide a sheet of kraft liner board, and to adhere the kraft liner board to one surface of the center ply. The sheet of kraft liner board thus functions as the back ply for the panel. More particularly, the kraft liner board provides a back surface that is convenient and easy to work with, and that substantially prevents splintering or splitting of the back surface of the panel. Preferably the back ply is adhered to the center ply in a platen pressing operation. The adhesive may either be applied to the center or back ply immediately prior to pressing or may be applied as a dry, heat reactivatable film laminated to the kraft liner board.

The face ply is initially laminated into a composite sheet of material. Specifically, in the preferred method a thin decorative paper is laminated to a kraft paper backing sheet. The composite face ply then is adhered to the center ply under the action of a platen press. The adhesive for securing the face and center plies may either be applied at the press lay-up area or may be pre-applied as a dry film to the kraft paper, to be reactivated under the heat and pressure of the platen. The protective topcoat preferably is pre-applied over the decorative paper. An alkyd melamine is the preferred material for the topcoat. A temporary removable topcoat of Mylar may also be employed for additional protection.

While the invention has been described and illustrated with respect to certain preferred embodiments, it is obvious that various modifications and changes can be made therein, without departing from the spirit of the subject invention which should be limited only by the scope of the appended claims.

What is claimed is:

1. A composite decorative panel comprising:
   a back ply formed from a kraft liner board or paper board material;
   a center ply comprised of a wood material and having opposed surfaces, one surface of said center ply being adhered in face to face contact with said back ply; and
   a face ply comprising a kraft liner backing layer, a decorative layer, a protective top coating secured in face to face relationship and a removable protective layer of plastic, the kraft liner backing sheet of the face ply being adhered in face to face contact with the surface of said center ply opposite said back ply.

2. A decorative panel as in claim 1 wherein the decorative layer comprises a thin decorative paper laminated to the kraft liner layer of said face ply.

3. A decorative panel as in claim 1 wherein the decorative coating comprises a decorative pattern imprinted on said kraft liner layer of said face ply.

4. A decorative panel as in claim 2 wherein the protective topcoat comprises an alkyd melamine.

5. A decorative panel as in claim 4 wherein said face ply further includes a heat activatable dry film applied to the surface of said kraft liner opposite said decorative paper and activatable under heat and pressure to adhere said face ply to said center ply.

6. A decorative panel as in claim 1, wherein said center ply comprises a wood veneer.

7. A decorative panel as in claim 6, wherein said center ply is approximately 0.1 inch thick.

8. A process for manufacturing a decorative panel comprising:
   providing a kraft liner backing layer and a sheet of thin decorative paper;
   adhering the thin decorative paper to one surface of said kraft liner to preform a face ply;
   providing a center ply comprised of wood;
   adhering said preformed face ply to one surface of said center ply; and
   subsequently adhering a back ply of kraft liner board or paper board material to the surface of said center ply opposite said face ply.

9. A process as in claim 8 further comprising the step of applying a protective topcoat to said decorative paper.

10. A process as in claim 9 wherein the topcoat comprises alkyd melamine.

11. A process as in claim 9 wherein the face ply is adhered to the center ply by flat platen pressing.

12. A process as in claim 11 further comprising the step of applying an adhesive to said center ply prior to platen pressing the face ply thereto.

13. A process as in claim 11 further comprising the step of applying a heat activatable dry film adhesive to the side of said kraft liner backing layer opposite said thin decorative paper.

* * * * *